Dec. 24, 1940.   S. V. DILLON   2,226,304
PIPE COUPLING AND SEALING MEANS
Filed Oct. 7, 1938

INVENTOR.
STEPHEN V. DILLON
BY
Barry + Cyr
ATTORNEYS.

Patented Dec. 24, 1940

2,226,304

UNITED STATES PATENT OFFICE 2,226,304

PIPE COUPLING AND SEALING MEANS

Stephen V. Dillon, Tulsa, Okla.

Application October 7, 1938, Serial No. 233,865

4 Claims. (Cl. 285—193)

This invention relates to improvements in pipe couplings and more especially to couplings of the quick detachable type.

One of the objects of the invention is to provide improved simple practical means to grip or release pipes inserted in the coupling housing.

Another object is to supply a coupling for use in joining pipes and which after assembly at the factory may be applied to the pipes without the use of tools, bolts or the like.

Another object is to furnish pipe couplings adapted to permit expansion, contraction or deflection of the pipes relatively to one another.

A still further object is to provide improved coupling means which may be incorporated in a pipe line or the like without the use of tools and which will include a lock joint that will necessitate the removal of a particular joint before couplings in the line may be removed.

Another object is to provide a pipe coupling including a unitary sealing ring, cage and balls, the latter being adapted to cooperate with an inclined surface in a housing to effectively grip a pipe inserted in the housing.

A further purpose of the invention is to supply a unitary sealing ring and ball cage made of any suitable elastic material such as rubber.

A further object of the invention is to supply improved sealing rings for pipe couplings and having an internal passageway which may be filled with a suitable fluid injected from the exterior of the coupling.

With the foregoing objects outlined and with other objects in view which will appear as the description proceeds, the invention consists in the novel features hereinafter described in detail, illustrated in the accompanying drawing, and more particularly pointed out in the appended claims.

Figure 1:
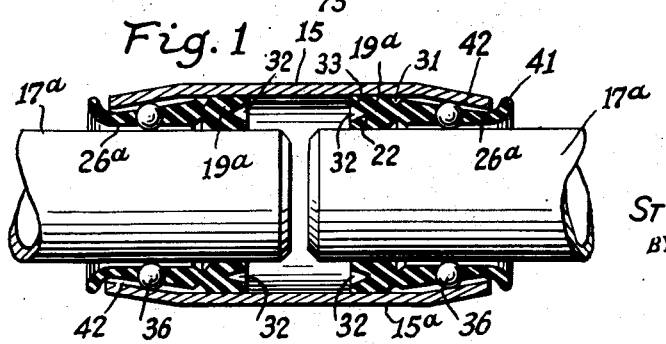
Fig. 1 is a longitudinal sectional view of one form of pipe coupling in accordance with the invention and shown mounted on the adjacent ends of a pair of pipes.

Referring to the drawing, it will be noted in Fig. 1, that 15 is a tubular housing which may be made of hard metal or any other suitable material and may be made in one piece or in sections such as half sleeves. The housing is adapted to receive the adjacent ends of the pipes 17a which extend into the housing. The housing contains sealing rings 19a made of any suitable elastic material such as rubber or the like. Each ring is provided at its end with an annular groove 32 which may be of V-shape in cross section and due to this construction, the ring has an outer lip 33 to be forced against the housing, and an inner lip 22 to be forced against the exterior of a pipe. This is accomplished by fluid under pressure which passes through the line, entering the groove 32.

Annular cylindrical cages 26a of elastic rubber or the like, surround the end portions of the pipe and are integral with the sealing means. Each cage is apertured for the accommodation of balls 26 adapted to roll on the pipes and contact tapered or frusto-conical surfaces 42 formed by the housing. The cages in this form of the invention project from the ends of the housing to permit the operator to engage the outer ends and push them inwardly to release the balls from wedging engagement with the surfaces 42.

The inner end portions of the cages terminate in the friction or sealing rings 19a which are of smaller internal diameter than the external diameter of the pipes and are adapted to tightly embrace the end portions of the pipe when the latter are inserted in the housing. Due to this construction, after the pipes have been inserted, if they are pulled away from one another, the friction rings will function to move the ball cages away from one another and to bring the balls into wedging engagement with the surfaces 42.

Figure 2:
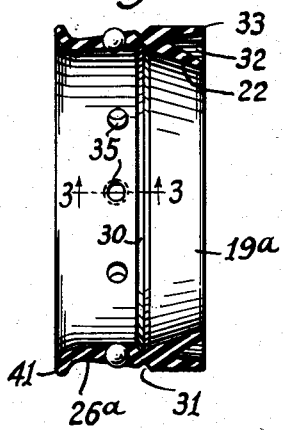
Fig. 2 is a diametrical sectional view of a combined sealing ring and ball cage, used in the structure shown in Fig. 1 and showing some of the balls carried by the cage.
Figure 3:
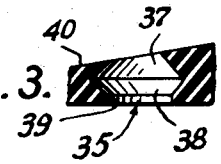
Fig. 3 is a detail sectional view of a portion of the cage and taken on the line 3—3 of Fig. 2.

In the embodiment of the invention illustrated in Figs. 1, 2 and 3, each sealing ring and its companion cage is made as a unitary structure and is preferably formed of an elastic material such as rubber or the like. It comprises a sealing ring portion 19a at one end thereof and a cage portion 26a at the opposite end thereof. The collar forming these portions is provided with oppositely disposed inner and outer grooves 30 and 31 whereby when the pressure in the line contacts the sealing ring, such grooves will tend to close and when the pressure is cut off, will tend to open and thus free the sealing ring from the pipe 17a.

The cage portion of the collar is provided with apertures 35 arranged in a circumferential series and functioning as retainers for balls 36. As best shown in Fig. 3, each aperture is of special shape and it is formed by especially shaped surfaces which define the same. For example, the aperture may be formed by oppositely disposed frusto-conical surfaces 37 and 38 with their bases merging into one another, and at the apex portion of the surface 38 there is an annular lip 39. With this construction a ball can easily be inserted from the exterior of the ring and as the lip 39 is thicker than the lip 40 at the entrance end of the aperture, it will prevent the ball from being pushed through when the balls are being assembled in the cage.

The outer end of the cage portion of the collar is flared as shown at 41, and such flared portion or extremity abuts against an end of the housing so that when a pipe is inserted, the ball cage and sealing ring assembly cannot go too far in the housing. As the extremity is flared, it also facilitates the entrance of a pipe end into the assembly. It may be seen from Fig. 2 that the inner surface of the lip 34 is of frusto-conical shape and as the pipe is of larger diameter than the free end portion of such lip, the sealing ring will be distorted when the pipe is inserted so as to cause the sealing ring to grip the outer surface of the pipe. Consequently, when the pipes are pulled apart, the sealing ring will function to force the cage portion outwardly and to cause the balls to wedge against the tapered surfaces 42 of the housing.

From an inspection of Figs. 1, 2 and 3, it may be readily seen that the coupling is of extremely simple and practical construction as it requires a housing involving very little machine work; two identical elastic collars, which may be molded inexpensively; and conventional balls of any suitable material but preferably of hard steel.

Figure 4:
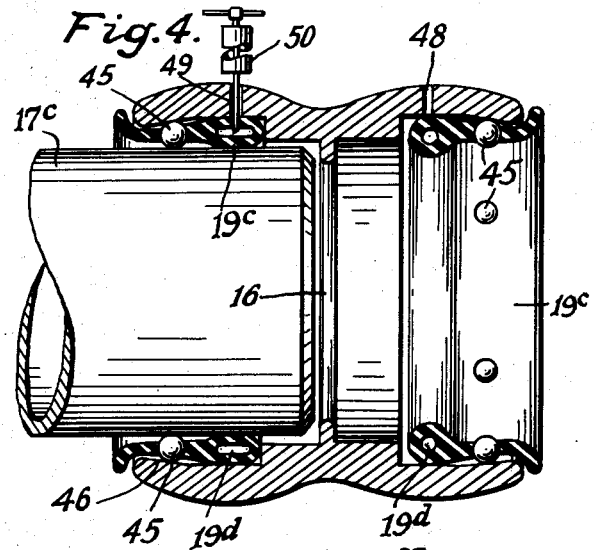
Fig. 4 is a longitudinal sectional view of another modification of the coupling showing one pipe inserted and means for injecting a liquid into a circular passageway within one of the packing rings.

In the modification of the invention illustrated in Fig. 4, I employ a unitary sealing ring and ball cage somewhat similar to the one shown in Fig. 4 but in this instance instead of providing the sealing ring portion 19c of the collar with sealing lips, I form the same with an internal substantially annular passageway 19d. Due to this construction, the sealing ring portion forms an annular bead at one end of the collar and having a rounded external surface, the inner circumference of which is of smaller diameter than the external surface of the pipe 17c. This will be apparent from an inspection of the sealing rings at the right and left of Fig. 4. The sealing ring at the right is in the condition it assumes before the insertion of the pipe, and the sealing ring at the left is in the condition it assumes after the pipe has been inserted. Obviously the insertion of the pipe causes the sealing ring to snugly embrace the pipe so that when the pipe is pulled outwardly, the balls 45 will be caused to be wedged against the pipe by the tapered internal surface 46 of the housing 47. The insertion of the pipe also acts to flatten out the internal passageway 19d. To increase the sealing action, the housing is provided with ports 48 which extend through the wall of the housing and are arranged in registration with the passageway 19d. This allows the puncturing element 49 of a fluid injector 50 to be used in penetrating the passageway 19d for the injection of a suitable fluid. It sometimes happens, due to flattened, corroded or otherwise distorted pipe, that small leaks occur in the coupling either at the time of installation or after the coupling has been installed, from various causes. My construction provides a means of taking care of irregularities of the pipe or in the housing itself or for misapplication of couplings, by providing a small hole in the housing so that the gasket can be reached by a hollow needle to permit the operator to force a suitable fluid in the cavity or passageway 19d of the sealing ring. Such fluid can be forced in under pressure, and obviously it will cause the sealing ring to be distorted so that the latter will fill any irregularities of the pipe or housing which contacts with the sealing ring. In some instances, I propose to employ a fluid such as a petroleum product that would cause the gasket, if made of rubber or the like, to swell thereby sealing off any leak without the necessity of taking the coupling off the line or disturbing the same. Of course, the hole formed in puncturing can be closed or sealed in any suitable way.

The housing, as shown in Fig. 4, may be provided with an internal annular shoulder 16 forming an abutment for the adjacent ends of the pipes. Such a structure prevents the housing from being moved along either one of the pipes a sufficient distance to uncouple a line, and obviously if couplers of this type are used in a line, it will be necessary to remove an end coupling of the line in order to break the latter.

Figure 5:
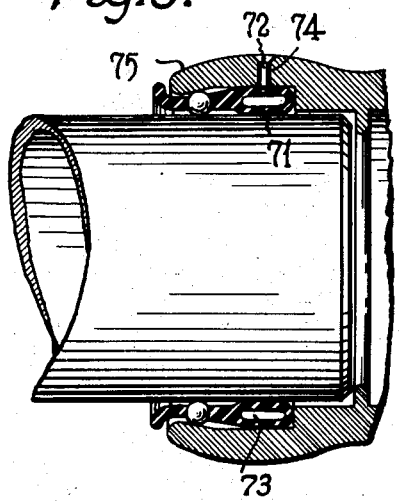
Fig. 5 is a view similar to a portion of Fig. 1 but showing a unitary ball cage and sealing ring; the latter being provided with a valve adapted to be used in inflating the ring with a suitable fluid.
Figure 6:
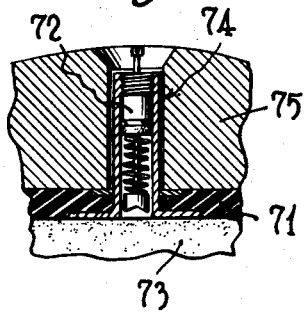
Fig. 6 is an enlarged sectional view of the inflating valve of Fig. 5.

In the modification of the invention illustrated in Figs. 5 and 6 I employ a structure like that in Fig. 4 but instead of puncturing the sealing ring 71 I provide the same with a valve structure 72 of the type employed in the inflation of tire tubes and the like. With such a structure, a tool for the injection of fluid into the cavity 63 of the ring may be attached to the valve 72 by having its nozzle inserted in the port 74 of the housing 75. Obviously sealing rings of the inflation type and illustrated in the drawing may be used with split housings or with housings which are non-sectional, and I intend to use the same on repair clamps of the type employed to repair leaks on bell and spigot pipes, and I may also make the sealing ring of two pieces instead of one, that is, I may make the same in two semi-circular pieces, and in that event the ends of the passageway in each piece would, of course, be plugged or permanently enclosed. With such rings, a leak occurring when the coupling or the like is installed or at a later time may be corrected by forcing a hydraulic fluid into the gasket, and if a derivative of crude petroleum, such as gasoline, kerosene or naphtha, is used for this purpose, it will cause the material of a rubber gasket or the like to swell and effect the desired sealing.

Many modifications of the invention will be apparent to those skilled in the art without departing therefrom or from the scope of the claims and since the foregoing disclosure has been given by way of example for clearness and understanding, no unnecessary limitations should be understood and the appended claims should be construed as broadly as the state of the art permits.

What I claim and desire to secure by Letters Patent is:

1. A structure of the character described, comprising a housing member having internal tapered seat means, a rod-like member telescopically received in the housing member, means for sealing the joint between said members and preventing separation thereof, said means including an elastic apertured sleeve of rubber-like material having a portion extending between said members and movable relatively thereto, and rolling elements mounted in the sleeve apertures, engageable with said internal tapered seat means, and movable with the sleeve relatively to said seat means, a portion of said sleeve frictionally engaging the exterior of said rod-like member and actuated by the latter for causing the sleeve to move with the rod-like member whereby the rolling elements are forced by said tapered means into wedging engagement with the rod-like member when the latter is moved in a direction away from the housing member.

2. A structure of the character described, comprising a housing member having internal tapered seat means, a rod-like member telescopically received in the housing member, means for sealing the joint between said members and preventing separation thereof, said means including an elastic apertured sleeve of rubber-like material having a portion extending between said members and movable relatively thereto, and rolling elements mounted in the sleeve apertures, engageable with said internal tapered seat means and movable with the sleeve relatively to said seat means, a portion of said sleeve frictionally engaging the exterior of said rod-like member and actuated by the latter for causing the sleeve to move with the rod-like member whereby the rolling elements are forced by said tapered means into wedging engagement with the rod-like member when the latter is moved in a direction away from the housing member, the inner end of the sleeve being provided with annular lips and an internal annular cavity positioned between the lips, one lip engaging the housing member and the other engaging the rod-like member, the sleeve having a thin grooved circular portion arranged between said groove and the sleeve apertures.

3. A structure of the character described, comprising a housing member having internal tapered seat means, a rod-like member telescopically received in the housing member, means for sealing the joint between said members and preventing separation thereof, said means including an elastic apertured sleeve of rubber-like material having a portion extending between said members and movable relatively thereto, the portions of the sleeve defining each aperture having opposite frusto-conical surfaces with their bases merging into one another, and rolling elements mounted in the sleeve apertures, engageable with said internal tapered seat means and movable with the sleeve relatively to said seat means, a portion of said sleeve frictionally engaging the exterior of said rod-like member and actuated by the latter for causing the sleeve to move with the rod-like member whereby the rolling elements are forced by said tapered means into wedging engagement with the rod-like member when the latter is moved in a direction away from the housing member.

4. Means for sealing the joint between telescoped members of a pipe coupling and for preventing separation of said members, comprising an elastic apertured sleeve of rubber-like material flared at one end and provided at its opposite end with annular lips and an internal cavity positioned between the lips, and substantially rigid rolling elements mounted in and extending through the sleeve apertures.

STEPHEN V. DILLON.